No. 620,680. Patented Mar. 7, 1899.
J. A. SOMMERS.
RAIN APRON FOR VEHICLES.
(Application filed Oct. 24, 1898.)
(No Model.)
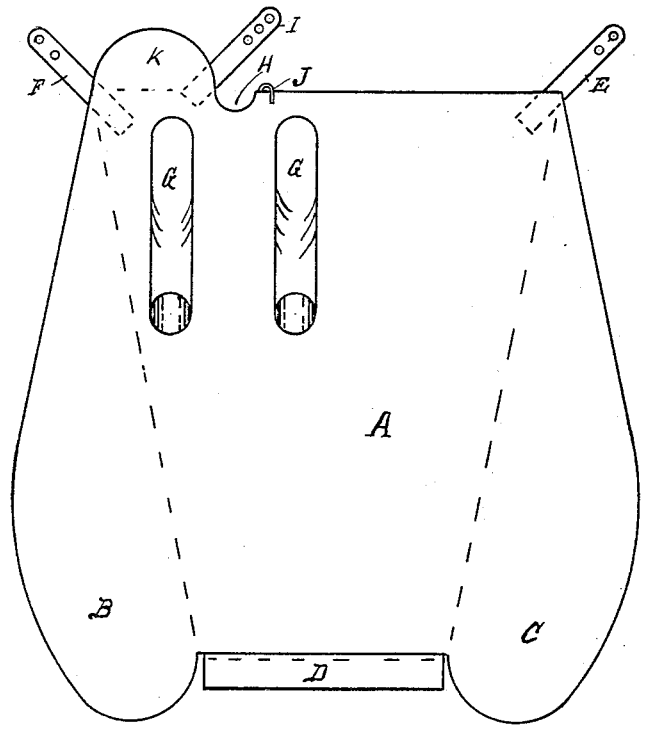
WITNESSES:
N. E. Carr
Mary Carr
Jacob A. Sommers INVENTOR
BY
Robert S. Carr, ATTORNEY

UNITED STATES PATENT OFFICE.

JACOB A. SOMMERS, OF HAMILTON, OHIO.

RAIN-APRON FOR VEHICLES.

SPECIFICATION forming part of Letters Patent No. 620,680, dated March 7, 1899.

Application filed October 24, 1898. Serial No. 694,467. (No model.)

*To all whom it may concern:*

Be it known that I, JACOB A. SOMMERS, a citizen of the United States, and a resident of Hamilton, in the county of Butler and State of Ohio, have invented certain new and useful Improvements in Rain-Aprons, of which the following is a specification.

My invention relates to rain-aprons of the class belonging to buggies or other vehicles; and the objects of my improvements are to provide a covering for the driver's arms and to permit perfect freedom of movement of the arms in controlling the lines. These objects are attained in the following-described manner, as illustrated in the accompanying drawing, in which the figure illustrates a plan of the apron embodying my improvements.

In the drawing the apron consists of oilcloth or other suitable waterproof material, wherein A represents the central portion, and B and C side wings depending therefrom and over the sides of the buggy-body. Hood D fits over the top of the buggy-dash in the usual manner to secure the foot of the apron thereto. Straps E and F, secured to the top corners of the apron, may be fastened to catches on the inside of the buggy-top to properly secure the top of the apron in place. Sleeves G are formed in one side of and near the top of the apron for the insertion therethrough of the driver's arms. Notch H for the driver's neck is formed in the top edge of the apron and above a middle point between the sleeves. Strap I encircles the back of the driver's neck and secures the apron thereto by being fastened to hook J.

An extension of the apron between the notch and strap F forms cape K to cover one shoulder of the driver. Said strap F may be omitted entirely from the apron, as it is not intended to be fastened to the buggy-top during the use of the sleeves that they may not be restricted thereby in their movement. Any other than the described manner of securing the apron to the vehicle dash or top may be adopted.

Having described my improvement, what I claim as my invention, and desire to secure by Letters Patent, is—

1. A rain-apron formed with sleeves, and with a hood adapted to detachably engage with the dash of a vehicle.

2. A rain-apron formed with sleeves, a neckband and a hood, said hood being adapted to engage with the dash of a vehicle.

3. A rain-apron formed with sleeves, neckfastenings, a shoulder-cape, and a hood, said hood being arranged to detachably engage with the top portion of the dash of a vehicle.

4. In a rain-apron the combination with a body, a hood formed on the lower edge thereof, lateral wings formed on the body and a fastening-strap attached to a top corner of the body of sleeves formed in one side of the top portion of the body and a neckband attached to the edge of the body above the sleeves.

JACOB A. SOMMERS.

Witnesses:
ROBERT S. CARR,
J. C. SLAYBACK.